United States Patent [19]

Pratt

[11] Patent Number: 4,659,272
[45] Date of Patent: Apr. 21, 1987

[54] BLIND FASTENER WITH TORQUE LOCK
[75] Inventor: John D. Pratt, Rancho Cucamonga, Calif.
[73] Assignee: Monogram Industries, Inc., Culver City, Calif.
[21] Appl. No.: 884,875
[22] Filed: Jul. 8, 1986

Related U.S. Application Data
[63] Continuation of Ser. No. 581,694, Feb. 21, 1984, abandoned.
[51] Int. Cl.4 .............................................. F16B 13/04
[52] U.S. Cl. ........................................ 411/43; 411/54; 411/303; 411/947
[58] Field of Search .................. 411/39, 43, 54, 56, 411/301, 302, 303, 253, 277, 278, 281, 242, 237, 935, 947

[56] References Cited
U.S. PATENT DOCUMENTS 2,765,699 10/1956 La Torre ............................. 411/43
3,129,630 4/1964 Wing et al. ......................... 411/43
3,289,724 12/1966 Ernest ................................ 411/303
3,643,544 2/1972 Massa ................................. 411/43
4,004,626 1/1977 Biblin et al. ....................... 411/947

FOREIGN PATENT DOCUMENTS 601865 7/1960 Canada ............................... 411/54
1073243 7/1960 Fed. Rep. of Germany .
1091079 11/1967 United Kingdom .

Primary Examiner—Gary L. Smith
Assistant Examiner—Neill Wilson
Attorney, Agent, or Firm—Pretty, Schroeder, Brueggemann & Clark

[57] ABSTRACT

A blind fastener for installation in aircrafts or the like and method for forming same comprised of a threaded nut threaded on a threaded screw or stem member having a stem head with a deformable sleeve mounted on the stem member between the stem head and the threaded nut. A torque lock is created between the threaded nut and the stem member to provide torque of the nut against the threads of the stem member without damaging the threads of the nut and the stem member.

5 Claims, 5 Drawing Figures

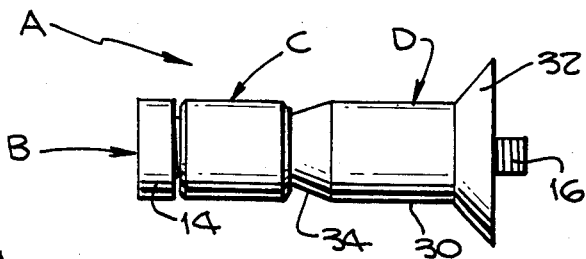
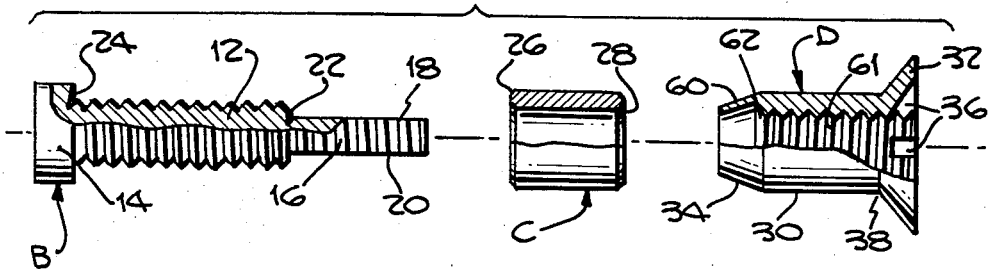
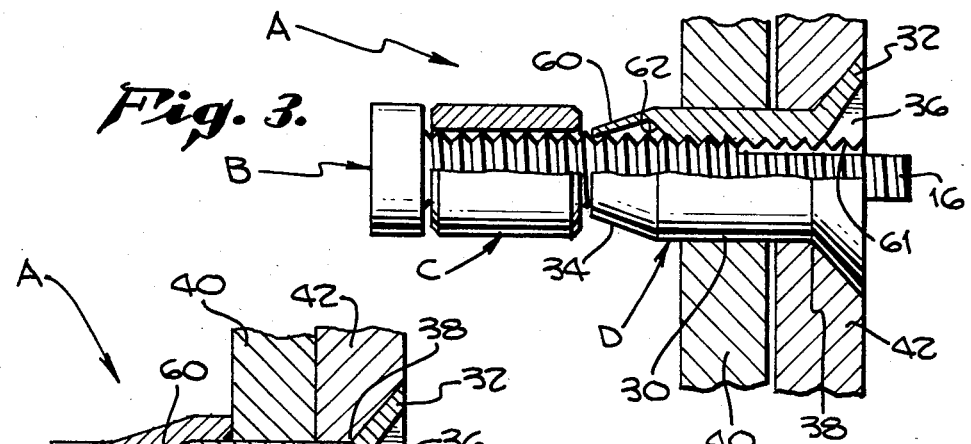
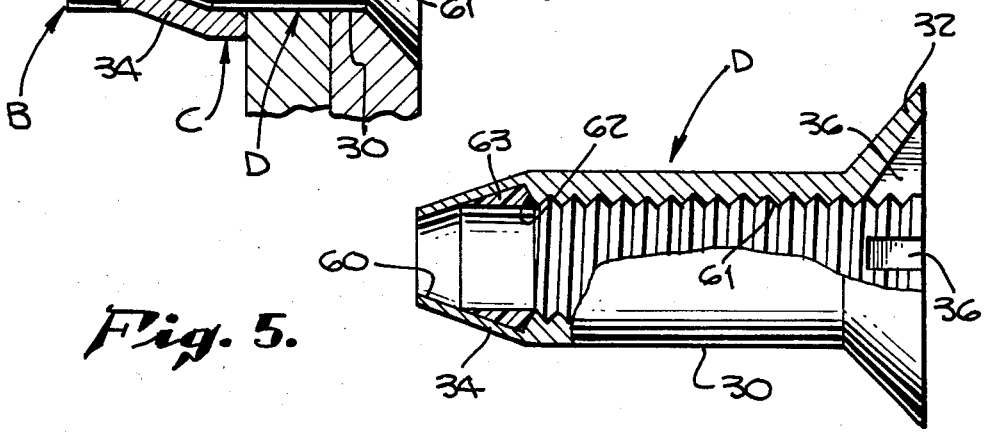

BLIND FASTENER WITH TORQUE LOCK

This application is a continuation, of application Ser. No. 581,694, filed Feb. 21, 1984, now abandoned.

BACKGROUND OF THE INVENTION

1. Field of the Invention

The invention relates to blind fasteners; and, more particularly, to blind fasteners and method for forming same for installation in aircraft structure having a threaded nut threaded on a threaded stem member, torque between the stem member and the nut being provided without damage to the internal threads of the nut and external threads of the stem member.

2. Description of the Prior Art

High-strength structural blind fasteners for use in airplanes, rockets and the like are described and claimed in U.S. Pat. No. 3,643,544. In that U.S. Patent to Massa, assigned to the predecessor in interest of the same assignee of this application, a blind fastener for installation in aircraft structures or the like is disclosed comprising a threaded screw having a screw head at one end and an internally threaded nut threaded on the other end, the nut having a head at one end and a tapered portion at the other end. A deformable sleeve is disposed on the stem member abutting at one end against the stem head and at the other end against the tapered portion of the nut. After assembly of the fastener components, indents are provided in the outside of the nut body deforming or distorting both the internal threads of the nut and the external threads of the stem member to provide a torque between the nut and stem member. These indents distort the threads in the area of such indentation and, as a result, there is a tendency for the threads to want to strip. The end result is that the fastener may not be able to carry as much load as possible and may unscrew during vibration. There is a need for providing the torque necessary for such fasteners without distorting the threads. Such a feature would enable the fastener to carry more load than known prior art fasteners and would not unscrew during vibration.

SUMMARY OF THE INVENTION

It is an object of this invention to provide a blind fastener having threaded nut threaded on a threaded screw member, torque being provided between the nut and screw member without distortion of the threads thereof.

It is a further object of this invention to provide a blind fastener as in the foregoing object wherein the torque is provided by a thinned section of the nut which section rubs on the major diameter of the screw threads of the screw member.

It is still further an object of this invnetion to carry out the foregoing object wherein the thinned section is thin enough to flex somewhat so as not to distort the threads of the screw member.

It is another object of this invention to provide an improved method for making a blind fastener with a torque lock between the nut and stem thereof.

These and other objects are preferably accomplished by providing a threaded nut threaded on a threaded screw or stem member having a stem head with a deformable sleeve mounted on the stem member between the stem head and the threaded nut. A torque lock is created between the threaded nut and the stem member to provide torque of the nut against the threads of the stem member without damaging the threads of the nut and the stem member. A resilient sealing ring may be provided between the threads of the stem member and the nut to prevent leakage.

BRIEF DESCRIPTION OF THE DRAWING

FIG. 1 is an assembled elevational view of a blind fastener in accordance with the invention;

FIG. 2 is an exploded view of the blind fastener of FIG. 1.

FIG. 3 is a vertical cross-sectional view of the assembled fastener of FIGS. 1 and 2 as installed in aircraft panelling;

FIG. 4 is a vertical cross-sectional view of the fastener of FIG. 3 after installation; and FIG. 5 is a vertical cross-sectional view of a modified component of the fastener of FIGS. 1 to 4.

DESCRIPTION OF THE PREFERRED EMBODIMENT

The reference character A designates an assembled blind fastener constructed in accordance with the present invention. The fastener comprises three parts, a screw or bolt B, a cylindrical tubular sleeve C on the shank of the screw adjacent to the head thereof as a nut D threaded onto the shank of the screw B at the end opposite the head. The fastener is assembled as a part of its manufacture and is sold in the assembled condition shown in FIG. 1 of the drawings.

The screw B forms the blind member or part of the fastener and comprises the threaded shank 12 (FIG. 2) having a head 14 formed integral with one end and a driving connection 16 at its other end. The driving connection 16 is, in the embodiment shown, a continuation or extension of the shank 12 of the screw provided with opposite flat sides 18 and 20 adapted to be engaged by a driving tool and connected to the shank proper by a weakened shank portion formed by a V-shaped groove 22 at the end of the flat sides 18 and 20 nearest the head of the screw. The external or overall diameter of the head 14 of the screw B is preferably about one and one half times the effective shank diameter. The bearing side of the head 14 of the screw may be undercut slightly, if desired, as indicated at 24.

The sleeve C is a continuous cylindrical, tubular member and forms the blind head part of the fastener. Opposite ends of the sleeve may be beveled slightly both externally and internally, as indicated at 26 and 28. The internal diameter of the sleeve C is such that it can be assembled on the shank 12 of the screw by hand. The nut D forms the external or nonblind part of the fastener and comprises the cylindrical body portion 30 having a flush head 32 formed integral with one end and a tapered or frustoconical bearing surface 34 on the other end; that is, the end adjacent to the collar C when the parts of the fastener are assembled.

The head 32 of the nut D is provided with a plurality of driving slots 36, four in the embodiment shown, equally spaced about the threaded aperture through the nut. The driving slots are relatively shallow so as to provide maximum material of the junction of the head 32 with the body 30 of the nut. To further strengthen the nut at this location the conical exterior surface of the head 32 joins the cylindrical body 30 with a radius 38, from about 0.03 to 0.08 inch, rather than a sharp angle. In use the fastener is inserted through aligned holes in the members to be secured thereby, for example, the members 40, 42, shown in FIG. 3, with the head 14 of the screw B leading until the head 32 of the nut D abuts the countersink in the accessible side of the member 42. The overall or outside diameters of the head 14 of the screw B, the sleeve C and the body portion 30 of the nut D are essentially equal to one another and the aligned holes in the members to be secured thereby are so formed as by drilling, that the fastener can be inserted therethrough but will not be loose therein. In some instances it may be desirable to make the external or outside diameter of the sleeve C slightly less, for example, about 0.002 inch, than that of the head 14 of the bolt B so as to avoid any possibility of marring or scratching the sleeve during assembly.

After the fastener A is assembled with the members to be secured together thereby, the fastener is driven or set by rotating the screw B relative to the nut D to draw and expand the nut end of the sleeve C over the adjacent tapered or conical end 34 of the nut D to form an internal or blind head. Preferably the screw B is rotated to contract the fastener and expand the blind head sleeve C over the conical end 34 of the nut D and move it into tight clamping engagement with the adjacent side of the member 40 while the head 32 of the nut D is drawn into tight clamping engagement with the adjacent side of the member 42 as shown in FIG. 4.

The screw B is rotated until the flattened end portion 16 breaks away from the shank 12 at the notched section or groove 22. This assures tightening or driving of the fastener to a predetermined stress or load. Due to its particular design the present fastener can be driven to as high as 50% of its design tensile load. The slots 36 may be omitted, if desired, and the fastener driven with a driver not requiring driving connections on the nut part.

The foregoing briefly describes the blind fastener described and claimed in U.S. Pat. No. 3,643,544, commonly assigned, the further teachings of which including the various dimensional relationships, are incorporated herein by reference. In U.S. Pat. No. 3,643,544, a plurality of depressions 44 are provided in the body of nut D to create an interference lock between the internal threads of the nut body and the external threads of screw B. The purpose of such depressions has been briefly discussed heretofore and is discussed in detail in U.S. Pat. No. 3,643,544.

However, no such depressions are shown in the fastener of FIGS. 1 to 3 herein. As seen in FIG. 2, the nut D includes tapered portion 34 having a thin walled configuration 60. The internal threads 61 of body portion 30 do not extend to configuration 60. As seen in FIG. 2, the inner wall configuration 60 extends inwardly to form a shoulder 62 at the junction with threads 61, and extends outwardly to form a terminal end having a diameter smaller than the diameter of threads 61. This wall configuration may be thin enough to flex somewhat without distorting the threads of screw 12 when threaded thereon. It can be seen in FIG. 3 that, in assembly, the terminal end of thinned tapered portion 34 rubs or rides on the major diameter of threaded shank 12 and is thus substantially the same diameter as the threads of shank 12 when threaded thereon. Since no distortion results to the threads of shank 12, the fastener herein can carry more load than prior art fasteners. The thinned wall configuration engaging threaded shank 12 provides the necessary torque between nut D and screw B without distorting the threads of these components. Since the threads are not distorted, there is no weakened thread area yet a torque lock is created between nut D and screw B. This torque lock functions similarly to the depressionsthread distortion in U.S. Pat. No. 3,643,544 but without thread distortion. The improved fastener herein can carry more load than known prior art fasteners yet won't unscrew during vibration.

As an alternative embodiment, as shown in FIG. 5 wherein like numerals refer to like parts of the embodiments of FIGS. 1 to 4, a resilient ring 63 may be provided in nut D to prevent leakage between the threads of threaded shank 12 and tapered portion 34. This ring 63 is preferably a resilient annular ring disposed within tapered portion 34 abutting against shoulder 62. It may be inserted before formation of tapered portion 34. That is, the end of nut D may be tubular then swaged to form portion 34. The end may be swaged after insertion of ring 63 thus trapping the ring therein. Any suitable mterials may be used for ring 63, such as nylon. This ring 63 may additionally provide some locking relationship between nut D and screw B.

In both embodiments, any suitable dimensions may be used for tapered portion 34. For example, the end of nut D prior to formation of tapered portion 34 may be machined to remove the internal threads of nut D, or left smooth during manufacture, then swaged to form portion 34. The preferred length of such portion 34 is discussed in detail in U.S. Pat. No. 3,643,544.

It can be seen that there is discussed a unique means for providing a torque lock in a blind fastener between the nut and screw thereof without destroying the efficiency of the threads of the screw.

I claim as my invention:

1. A blind fastener for mounting in aligned openings through two workpieces to connect them together in overlapped outer and inner relation and adapted to be set by wrench means, the fastener comprising:

an internally threaded, generally tubular nut received within the openings in the workpieces, said nut having
an enlarged body head for engagement with the outer surface of the outer workpiece, and
a tapered nose projecting inwardly beyond the inner workpiece, said tapered nose having an outer surface tapered radially inwardly in a direction toward the inserted end of said nut, and an unthreaded inner surface substantially parallel to the tapered outer surface, said tapered nose further having a terminal end that is smaller in diameter than the internal thread diameter of said nut to form an interference fit between said nose and the thread of a screw passing through said nut;
an externally threaded screw passing in threaded engagement through said nut, turning motion of said screw relative to said nut in one direction moving said screw in an axially outward direction through said nut, said screw having
an enlarged screw head spaced from the terminal end of said tapered nose, and
a wrench engaging region spaced from the outer end of said body head; and
a deformable sleeve around said screw in contact with said screw head, movement of said screw outwardly through said nut deforming said sleeve over said tapered nose to a fully set condition in overlying contact with the inner surface of the inner workpiece, the terminal portion of said tapered nose being adapted to frictionally ride on the external threads of said screw at their major diameter throughout turning motion of said screw to form an interference-type torque lock between said nut and said screw substantially without distortion of the external threads of said screw.

2. The blind fastener of claim 1, wherein the outer surface of said tapered nose is substantially conical, with the inner surface terminating in an inwardly extending shoulder at the intersection between the inner surface and the internal threads of said nut.

3. The blind fastener of claim 2, wherein the inner surface and the shoulder of said nut and the external threads of said screw cooperate to form an annular space encircling said screw.

4. The blind fastener of claim 3, wherein a resilient ring is positioned within the annular space for preventing fluid leakage between said nut and said screw through the annular space.

5. The blind fastener of claim 3, wherein a resilient ring is positioned within the annular space and provides a locking relationship between said nut and said screw.

* * * * *